United States Patent [19]
Fogg et al.

[11] Patent Number: 6,163,778
[45] Date of Patent: Dec. 19, 2000

[54] PROBABILISTIC WEB LINK VIABILITY MARKER AND WEB PAGE RATINGS

[75] Inventors: BJ Fogg, Stanford; Jakob Nielsen, Atherton, both of Calif.

[73] Assignee: Sun Microsystems, Inc., Palo Alto, Calif.

[21] Appl. No.: 09/019,797

[22] Filed: Feb. 6, 1998

[51] Int. Cl.[7] .................................................. G06F 17/30
[52] U.S. Cl. ................................................ 707/10; 707/3
[58] Field of Search ............................ 707/3, 4, 10, 500, 707/513, 514; 709/224

[56] References Cited

U.S. PATENT DOCUMENTS

| | | | |
|---|---|---|---|
| 5,530,856 | 6/1996 | Dahod et al. | 395/600 |
| 5,835,905 | 11/1998 | Pirolli et al. | 707/3 |
| 5,870,557 | 2/1999 | Bellovin et al. | 395/200.54 |
| 5,870,559 | 2/1999 | Leshem et al. | 709/224 |
| 5,937,165 | 8/1999 | Schwaller et al. | 709/224 |
| 5,968,125 | 10/1999 | Garrick et al. | 709/224 |

OTHER PUBLICATIONS

David C Blight, "Annotated Reference List Agents," 1997 Conference on Communications, Power and Computing, WESCANEX '97 Proceedings, May 1997, pp. 7–12.

Neil Bowers, "Webtint=Quality Assurance for the World–Wide Web," May 1996, 11 pages at <http://www.weblint.org/www5–paper.html>.

Rick Hower, "Beyond Broken Links," Internet–Systems, Jul. 1997, 6 pages at <http://www.dbmsag.com/9707i03.html>.

"Web Site Garage," Tuneup FAQ, 6 pages, date unknown, at <http://websitegarage.netscape.com/0=wsg/tuneup–plus/tuneup–faq.html>, date unknown.

James E Pitton et al., "Supporting the Web=A Distributed Hyperlink Database System," 5th International World Wide Web Conference, May 1996.

May 6–10, 1996, pp. 1–15, at <http//www5conf.inria.fr/fich–html/papers/P10/Overview.html>.

*Primary Examiner*—Paul V. Kulik
*Attorney, Agent, or Firm*—McDermott, Will & Emery

[57] ABSTRACT

Hypertext information links are typically contained in documents accessible by networks. Data is gathered regarding the results of attempted access to documents identified by these links. The link's viability is calculated based on the number of successful attempts resulting in successful access in order to provide a measure of link viability. The display of the document is altered based on the measure of link viability. An average of link viability for all links on the document, and on the site, is used to calculate document viability and site viability which can be used to rate the document and site, respectively. These viability measures are displayed along with the corresponding link, document, and site. Display of results retrieved by conventional search engines may be sorted based on link, document or site viability, and displayed accordingly. Links contained in bookmark lists are also measured for viability to cull out bookmarks with low link viability to, or low document viability of, the bookmarked document. Viability calculations may be made by a user computer device, an Internet Service Provider, a third party service, and/or a server on which a document resides.

39 Claims, 15 Drawing Sheets

Figure 4

| Measure of viability | Link identifier | Attempts | Successful attempts | Date/time |
|---|---|---|---|---|
| | | | | |

420 — Measure of viability
410 — Link identifier
412 — Attempts
414 — Successful attempts
416 — Date/time
400

Figure 7

| Average rating for links in document | Page identifier | # Links |
|---|---|---|
| | | |

714 — Average rating for links in document
710 — Page identifier
712 — # Links
700

Figure 8

| Site identifier | Weighted average of documents on site | Unweighted average of documents on site |
|---|---|---|
| 810 | 812 | 814 |

| Site identifier | Bookmark descriptor | Date last access |
|---|---|---|
| 1402 | 1404 | 1406 |

1400

PROBABILISTIC WEB LINK VIABILITY MARKER AND WEB PAGE RATINGS

BACKGROUND OF THE INVENTION

1. Field of the Invention

The invention is directed to information systems, and more particularly, to determining the viability of hypertext links in a network, such as the World Wide Web.

2. Description of Related Art

Large information networks, such as the World Wide Web are well-known in the art. Documents stored in such an information system contain information links, such as hypertext links, to related information.

The Problems

Navigating through information space in network information systems such as the World Wide Web (the web) by using such links can be a frustrating experience because the web is a dynamic environment where documents are frequently moved, outdating the network addresses pointed to by some information links. Further, some network components, such as servers or pointers, may be temporarily or permanently out of service. Rather than connecting a user to a network address, such as URL (Universal Resource Locator) every time the link is attempted, not infrequently an error message, such as "ERROR 404, file not found", is generated when users click on a link that does not work. Users have no way of telling if the link is temporarily disabled (due to network traffic, web site updates, etc.) or permanently disabled due to a web page that has moved or been shut down. Understanding the differences between temporary and permanent disablement is important in order to know if the user can profitably return to the desired site at a later time. Unfortunately, users have no way of knowing this information with current techniques.

Web site creators have little incentive to continually update links they list or to take down old web pages. Therefore, network users are likely to encounter more and more outdated web pages with links that never work.

Unpredictability of web links leads to a lower-quality experience when people use the web. If users start perceiving the web as unpredictable or as a ghost-town, users may be less inclined to seek information through the web. The prior art provides only a binary indication whether a link is broken or viable. There is thus a need for a way for web users to know the probability that a given web link will work, and a method for rating web pages based on the viability of the links on the page.

SUMMARY OF THE INVENTION

The problems of the prior art are overcome by providing methods, apparatus, systems, and computer program products for calculating information link viability and rating documents and sites based on the link viability. Data is gathered regarding the results of attempted access to these information links. The viability of an information link is calculated based on the number of successful attempts to access the link in order to provide an indication or measure of link viability. The display of the document is altered based on the measure of link viability. In some embodiments, an average of link viability for all links on a document may be used to calculate a measure of document viability which can be used to compare that document with other documents. Similarly, a site rating may be calculated based on the average page viabilities on the site or the average link viabilities for all links on the site. These indications may be displayed along with the corresponding link, document, and site. Display of results retrieved by conventional search engines may be sorted or ordered based on link, document or site viability and displayed accordingly. The viability of links contained in bookmark lists are also measured for viability to cull out bookmarks with low viability. Viability can also be used in conjunction with relevance ranking by searching on engines during keyword searching. The viability calculations may be made by a user computer, an Internet Service Provider, a third party service, and/or the server on which the document resides, depending on implementation.

The foregoing and other features, aspects and advantages of the present invention will become more apparent from the following detailed description of the present invention when taken in conjunction with the accompanying drawings.

NOTATIONS AND NOMENCLATURES

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at time, principally for reasons of common usage, to refer to these signals as bits, values, elements, symbols, characters, terms, numbers, or the like. It should be noted, however, that all of these and similar terms are to be associated with the appropriate physical quantities and are merely convenient label applied to these quantities.

Further, the manipulations performed are often referred to in terms, such as adding or comparing, which are commonly associated with mental operations performed by a human operator. No such capability of a human operator is necessary, or desirable inmost cases, in any of the operations described herein which form part of the present invention; the operations are machine operations. Useful machines form performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machine will appear from the description given.

BRIEF DESCRIPTION OF DRAWINGS

The objects, features and advantages of the system of the present invention will be apparent from the following description in which:

FIG. 4 illustrates a typical format of a database storing information about a link attempt.

FIG. 7 illustrates a typical format of a database storing information about document rating based on link viability.

FIG. 8 illustrates a typical format of a database storing information about site rating based on link viability.

FIG. 14 illustrates a typical format of a database storing information used in the process depicted in FIG. 13.

DETAILED DESCRIPTION OF ILLUSTRATED EMBODIMENTS

Figure 1A:
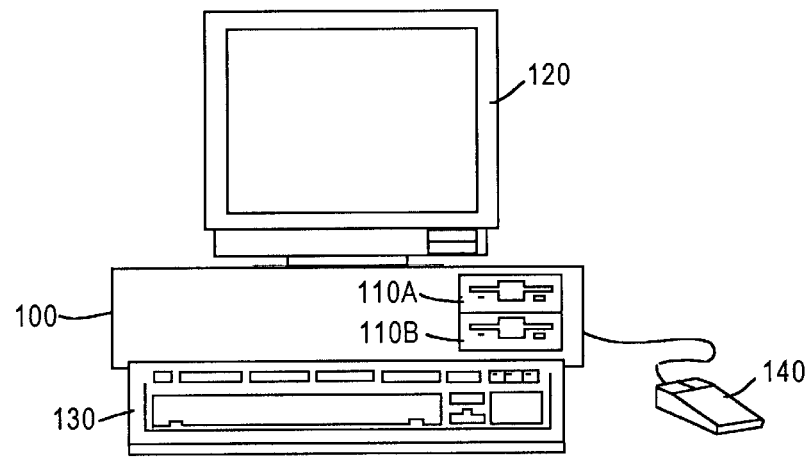
FIG. 1A illustrates a computer of a type suitable for carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicted by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC™ workstation from Sun Microsystems, Inc.

Figure 1B:
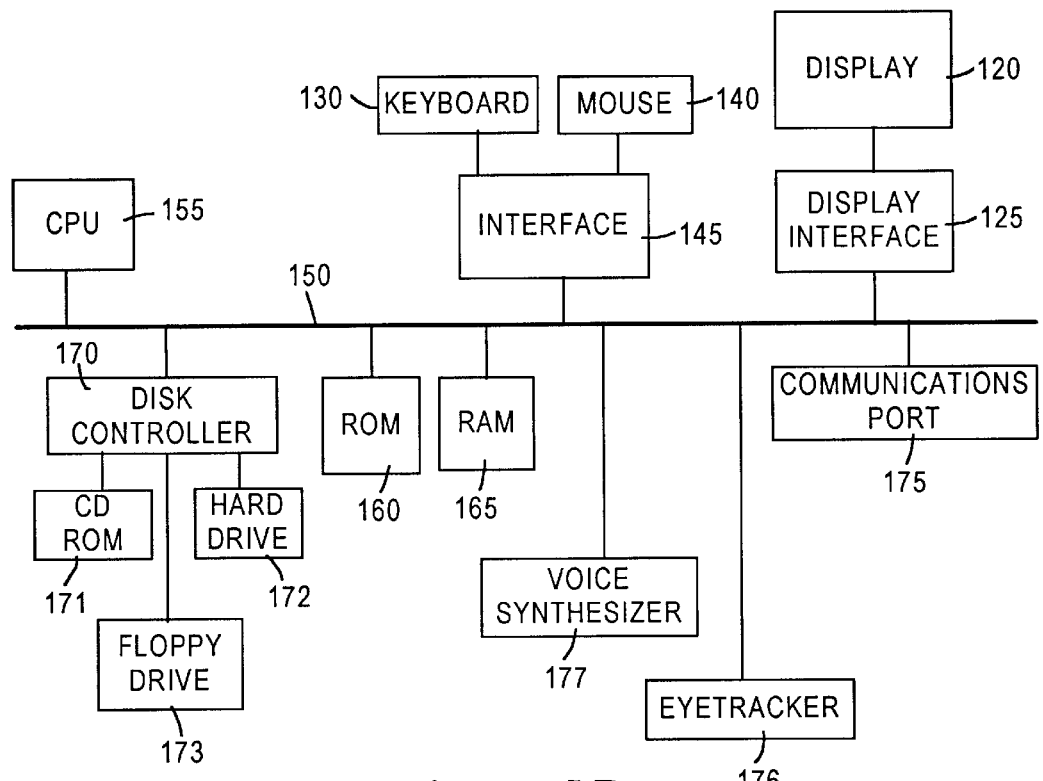
FIG. 1B illustrates a block diagram of exemplary internal hardware of the computer of FIG. 1A.

FIG. 1B illustrates a block diagram of the internal hardware of the computer of FIG. 1A. A bus 150 serves as the main information highway interconnecting the other components of the computer. CPO 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. An eyetracker 176 and a voice synthesizer 177 (with usual interfaces) are used in clearing error messages. Communications with external devices can occur over communications port 185.

Figure 1C:
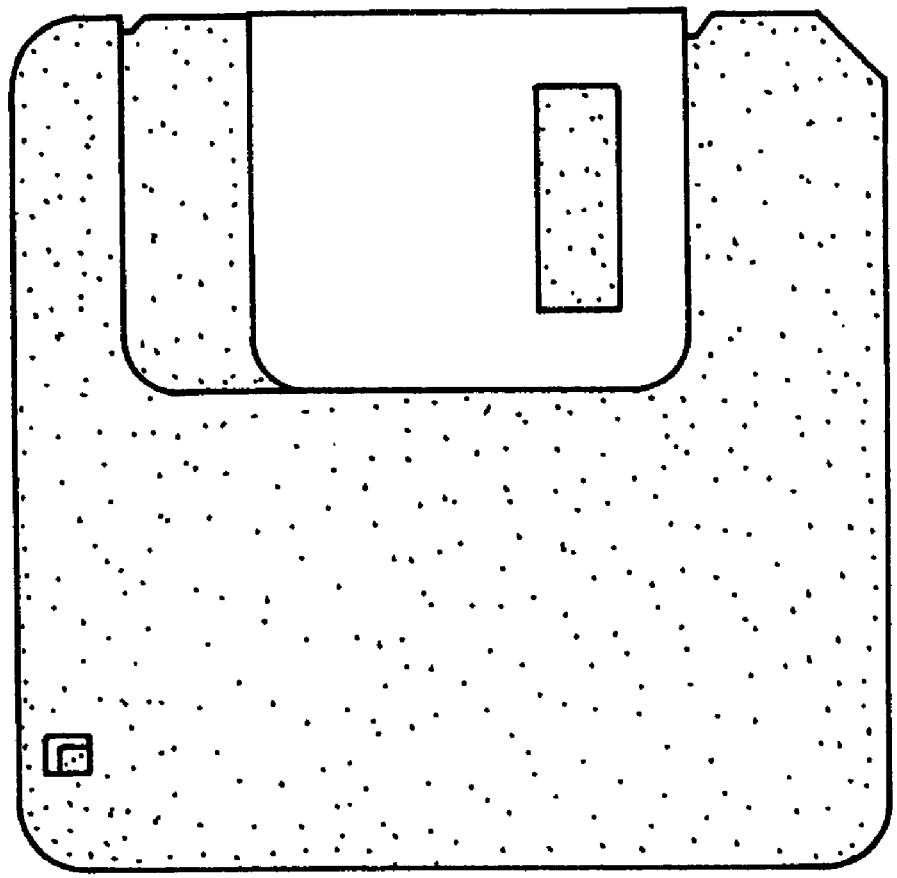
FIG. 1C illustrates an exemplary memory medium suitable for storing program and data information in accordance with the invention.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention.

Figure 1D:
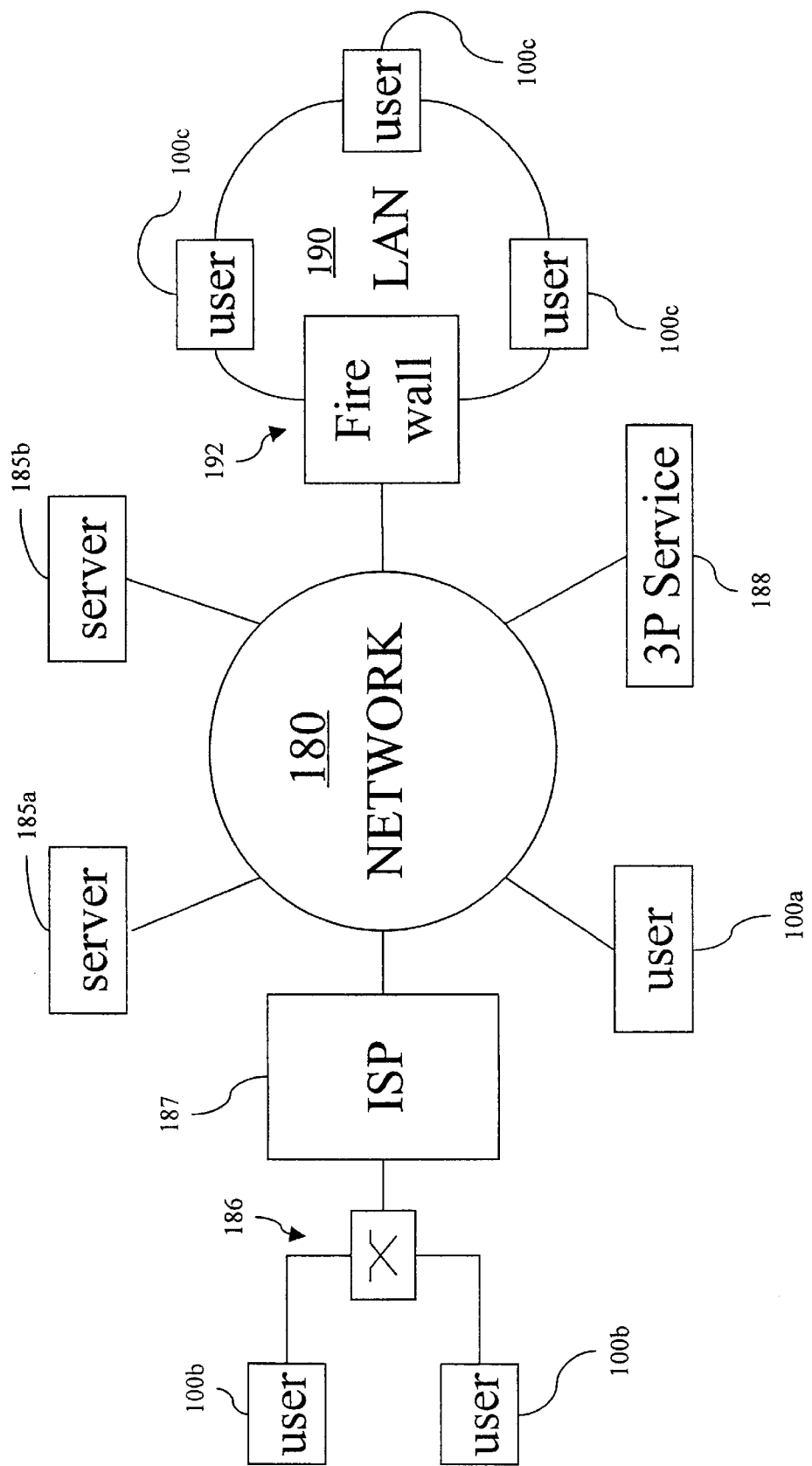
FIG. 1D is a block diagram of a network architecture suitable for carrying data and programs in accordance with some aspects of the invention.

FIG. 1D is a block diagram of a network architecture suitable for carrying out data and programs in accordance with aspects of the invention. Network 180 can be any network such as the Internet. Network 180 serves to connect user computers 100a, 100b, 100c to each other and to data and programs. User computer 100a is connected directly to network 180, which can be achieved by a T1, T2 or T3 line. User computers 100b access network 180 through a telephone switch 186 which is connected to an Internet Service Provider (ISP) 187 which provides online service access to network 180. User computers 100c are connected to each other via a local area network (LAN) or intranet 190. LAN 190 has a firewall or proxy server 192 that controls the access of user computers 100c to network 180. When network 180 is configured like the World Wide Web, servers 185a and 185b provide access to web sites stored therein. Each website is uniquely identified by a URL (universal resource locator) which access a home page or document that typically has information links to other pages or documents on the same site, or a different site which may reside on server 185a or another server such as 185b.

One way to navigate through the cyberspace of network 180, such as the Internet or World Wide Web, is to type a Universal Resource Locator (URL) into an address space on a web-browser's tool bar displayed on user computer 100b, for example. For example, typing in http://www.company.com initiates a connection to a "company's" web site. Alternatively, it could access another site within the same domain, such as in an intranet implementation.

Another way to navigate through the Internet is to access a hyperlink. A hyperlink is often a colored or underlined text phrase or a graphic that is linked to a concealed address of a document on a site on server 185a. A site is a collection of files, documents and graphics that someone has made generally available to others through network 180. The text phrase is generally not the actual address. The underlined words could hide a link to the home page of a company that actually looks like: http://www.company.com.

The browser software on the user's computing device typically sends the address to a network, either directly through a data connection to a network, or via a modem used to connect over a dial-up network to an Internet Service Provider (ISP).

The ISP 187 or LAN 190 sends the address to the nearest node of the domain named system (DNS). The DNS is a cooperatively run set of databases, distributed among servers, that volunteers to be a repository for a different kind of address called IP (Internet Protocol). This address standard is expressed in four numbers between 1 and 256 separated by periods, as opposed to the text of the URL. For example, the IP of www.company.com might be 205.181.121.101.

The DNS returns the site's IP address to the browser. Using the IP, the browser sends a request through a router which consults the most recent report of Internet traffic and transfers the request along a path with the least traffic. At each intersection in the Internet, the routing process is repeated to avoid traffic jams. When the site server 185*a* receives the browser's request, the site server 185*a* reads the origination address in the header and returns a signal to acknowledge receipt of the request. At this point, the message in the status line at the bottom of the browser's display screen changes to notify the user of the successful connection (e.g., "waiting for reply"). The request itself is put into a queue to wait until the server 185*a* finishes fulfilling earlier requests.

Server 185*a* may send the request to a different server 185*b*, where the page actually resides. For example, jumping to www.company.com may automatically take the user to a welcome page or company's "home page".

A document or web page itself is comprised of a text file of a mark-up language such as HTML (hyper text mark-up language). HTML is a collection of codes that control the formatting of text in the file. The codes may also include the URLs of graphics, videos and sound files that exist elsewhere on the server 185*a* or on a different site entirely contained, for example on another server 185*b*. When the server 185*a* is free to respond to the browser request, the server 185*a* sends the HTML document back over the Internet to the browser's Internet Service Provider address. The route used to get to the user's PC may differ vastly from the route the user's request followed to reach the server 185*a*.

As the different parts of the page arrive at the user's PC, the parts are stored in a cache, a combination staging area and reservoir. If later, the browser requests the same page or any of the elements on the page, such as a graphic, the browser retrieves it from the cache rather going back over the Internet to the original sources.

Meanwhile, the browser begins using the elements in the cache to reassemble the web page onscreen, following the hidden HTML codes in the main document to determine where to place text, graphics or videos onscreen. Because not all portions of the web page arrive at the PC at the same time, different parts of the page appear onscreen before others. Text, which is the simplest element to send, usually appears first, followed by still and animated graphics, sounds and music, and videos. Icons in the upper-right corners of both Netscape Navigator™ and MicroSoft™ Internet Explorer™ are typically animated, while parts of the page are still being received. When all elements have arrived and have been added onscreen, the animations freeze into still images, telling you that the entire web page has now been successfully retrieved by the browser.

A website that includes a search engine, such as AltaVista™, Yahoo!™, or Excite!™, regularly runs programs called webcrawlers, or spiders, to gather information about what is accessible via network 180. The spiders search sites across the World Wide Web indexing information on those sites. Some spiders follow every link they find. Other spiders follow only certain types of links, ignoring those that lead to graphics, sound and animation files, or those that lead to certain Internet resources, such as WAIS (Wide Area Information Server) databases.

When a spider identifies a document, the spider uses indexing software to index the information. Like the index in the back of a book, a web index eases and quickens the location of a specific piece of information. The type of information indexed depends on the search engine. Some search engines index every word in each document. Others index the most frequently used words or words in its title, headings, and subheadings and/or the document's size and date of creation.

Figure 2:
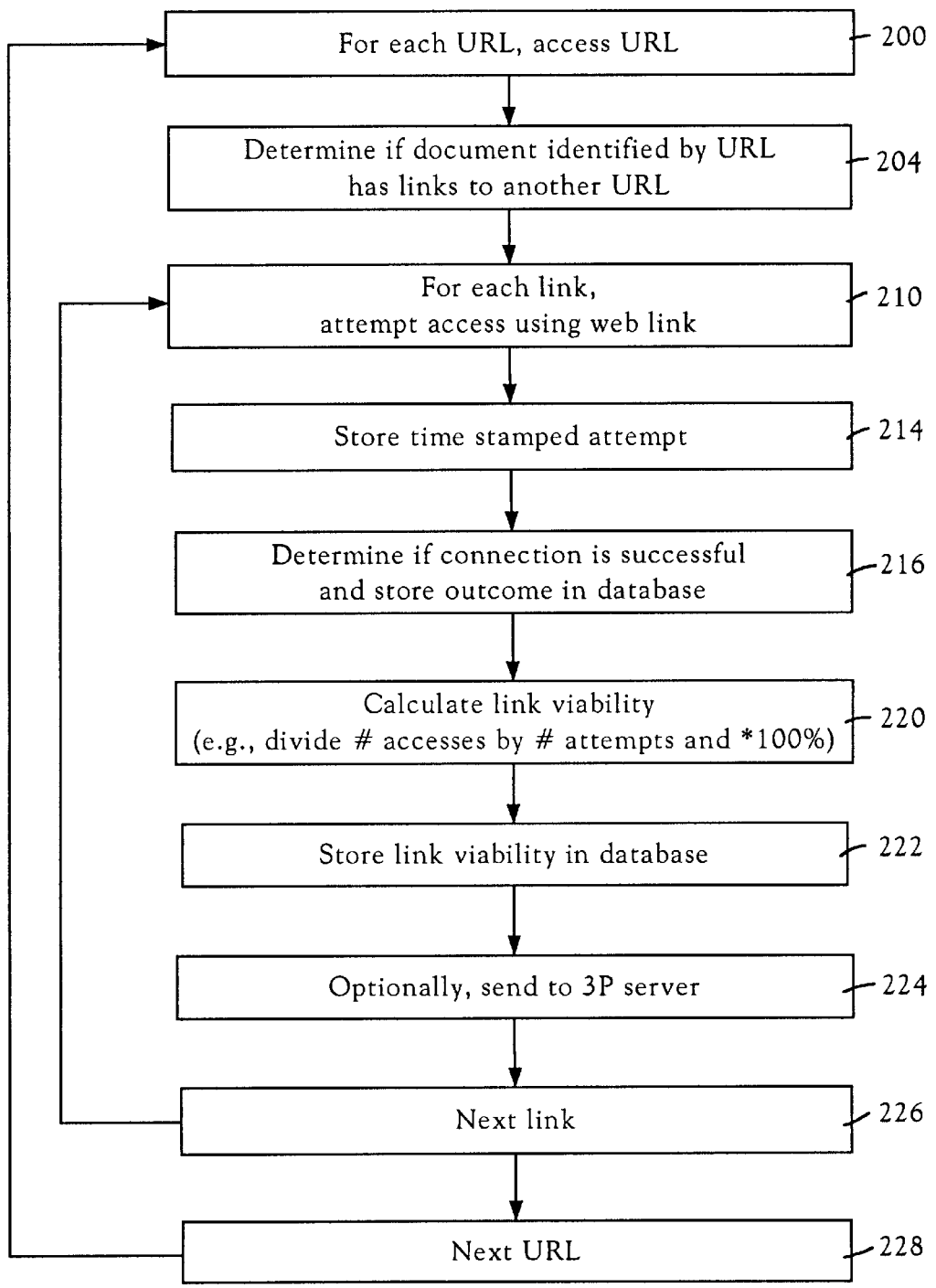
FIG. 2 is a flow chart of an exemplary process used for determining information link viability in accordance with one embodiment of the invention.

FIG. 2 is a flow chart of an exemplary process used for determining information link viability in accordance with one embodiment of the invention. The process of the present invention begins a loop at step 200 where, for each URL, a client (such as a user computer 100*a*, *b*, *c*, an ISP 187, servers 185*a* and 185*b*, a third party service 188, or firewall 192) accesses the URL. Next, the client determines 204 if the web document identified by the URL has links to another URL. The process enters another loop 210 where for each link, access to the referenced URL is attempted using the web link.

Thus, the client connects to server 185*a* and requests download of a web document. The web document may contain a hypertext link to a second document located on server 185*a* or another server 185*b*. If the client desires to retrieve the second document, the client may access the second document via the information link, such as the hypertext link, and the client attempts 210 to connect to the server where the second document is supposed to be located. The attempt is time stamped and stored 214 in a database, such as database 400 described in conjunction with FIG. 4 below.

There are several reasons why a document may not be available. For example, a communications link linking the requesting user to a server may be down. Alternatively, the server itself may be down for maintenance or because of a malfunction. It may also be that document two has been removed from the server or the address for document on its server has been changed. It may also be that document two has been moved to another server. As another example, the information pointing to document two may contain a typographical error (in the HTML of document one) which does not accurately point to the second document. Some of the reasons for an information link being unavailable are merely temporary, whereas others are substantially permanent.

At step 216, the client determines whether the connection is successful, and the outcome is stored in database 400. Next, the client calculates 220 link viability using the data stored in database 400. An example calculation of link viability includes dividing the total number of successful access stored in the database by the total number of attempts and multiplying by 100%. This measure of link viability is also stored 222 in database 400. If the client is not third party service 188, the data is optionally sent 224 to third party service 188 which houses another database 400 to act as a repository for data gathered by other clients. In this way, the third party service 188 supplies reliable data, based on large numbers of results of link attempts from many clients, to subscribing users.

The process continues by accessing 226 the next link, if one exists, and returning to step 210 to proceed through the steps of FIG. 2 until all links have been processed. Then, the next URL is accessed 228 and the process loops back to step 200 to repeat the process described in conjunction with FIG.

2 until all URLs (pages) on a site are processed. The process is repeated periodically to maintain calculations of link viability current.

Figure 3:
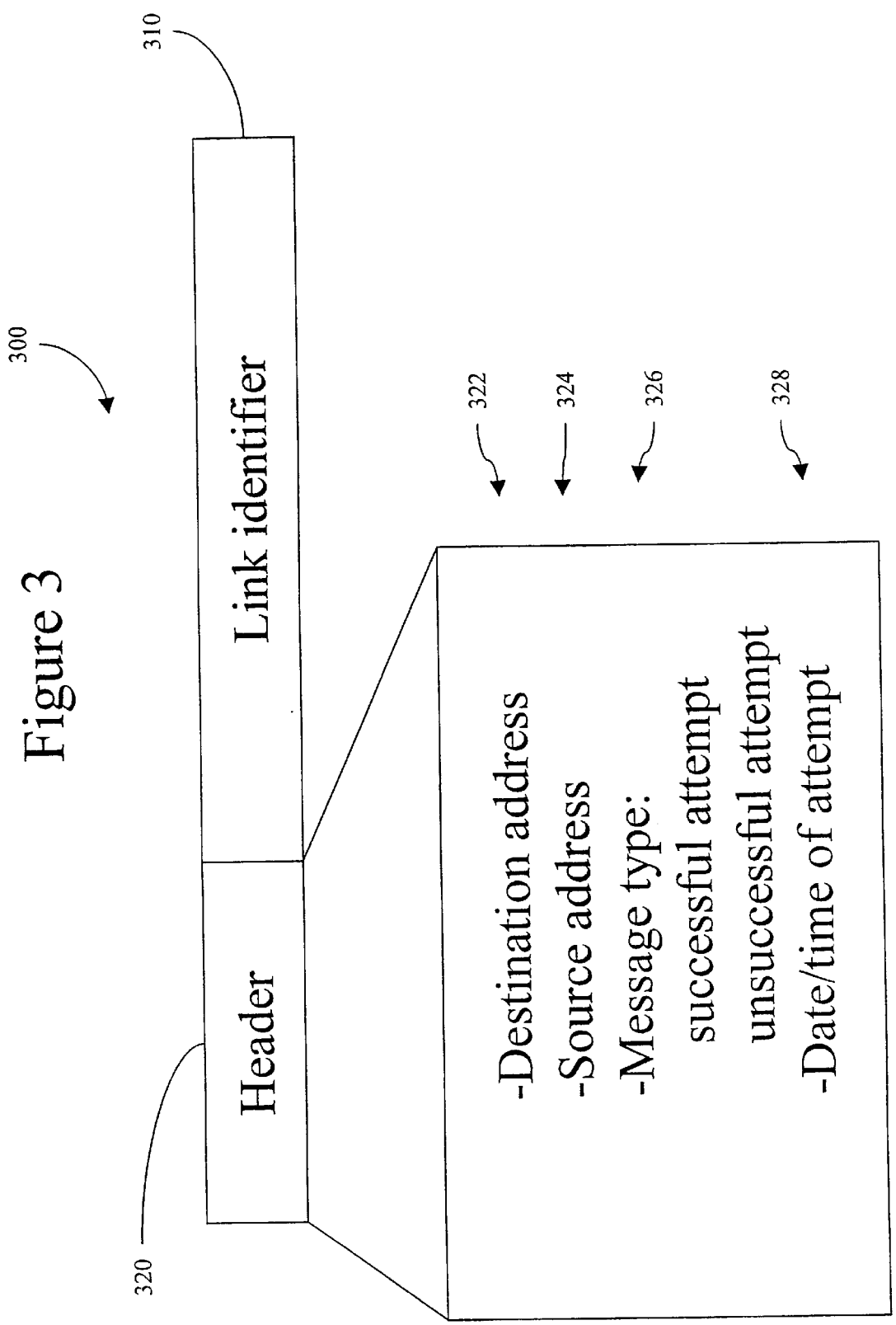
FIG. 3 illustrates an exemplary message format used in reporting results of link access attempts in accordance with one embodiment of the invention.

FIG. 3 illustrates an exemplary message format used in reporting results of link access attempts stored in database 400. The message is formatted as a package 300 and includes a link identifier 310 that is uniquely associated with the link for which access is attempted. The message 300 also comprises a header 320 that includes, as an example: a destination address 322 uniquely identifying the location where the data is to be stored; a source address 324 uniquely identifying a location from which the attempted link access was made; an identifier of message type 326 that conveys information such as whether the attempt was successful or unsuccessful; and a time stamp 328 including the date and time of day when the attempt was made.

FIG. 4 illustrates a typical format of database 400 in which a plurality of messages 300, indicating information about a link attempt, are stored. For example, each individual link identifier 310 is stored in a link identifier field 410. Message type 326 populates both a number of attempts field 412, and possibly number of successful attempts field 414. The date/time of each attempt 328 populates the date/time field 416. Based on at least the number of attempts and the number of successful attempts, a measure of viability field 420 is populated for each link identified. An example calculation of link viability is the percentage of successful attempts out of the number of total attempts is one measure of link viability. However, many other calculations can be made and stored in location 420, including weighting more recent results more heavily than older results, and /or considering only results within a particular window of time.

Figure 5:
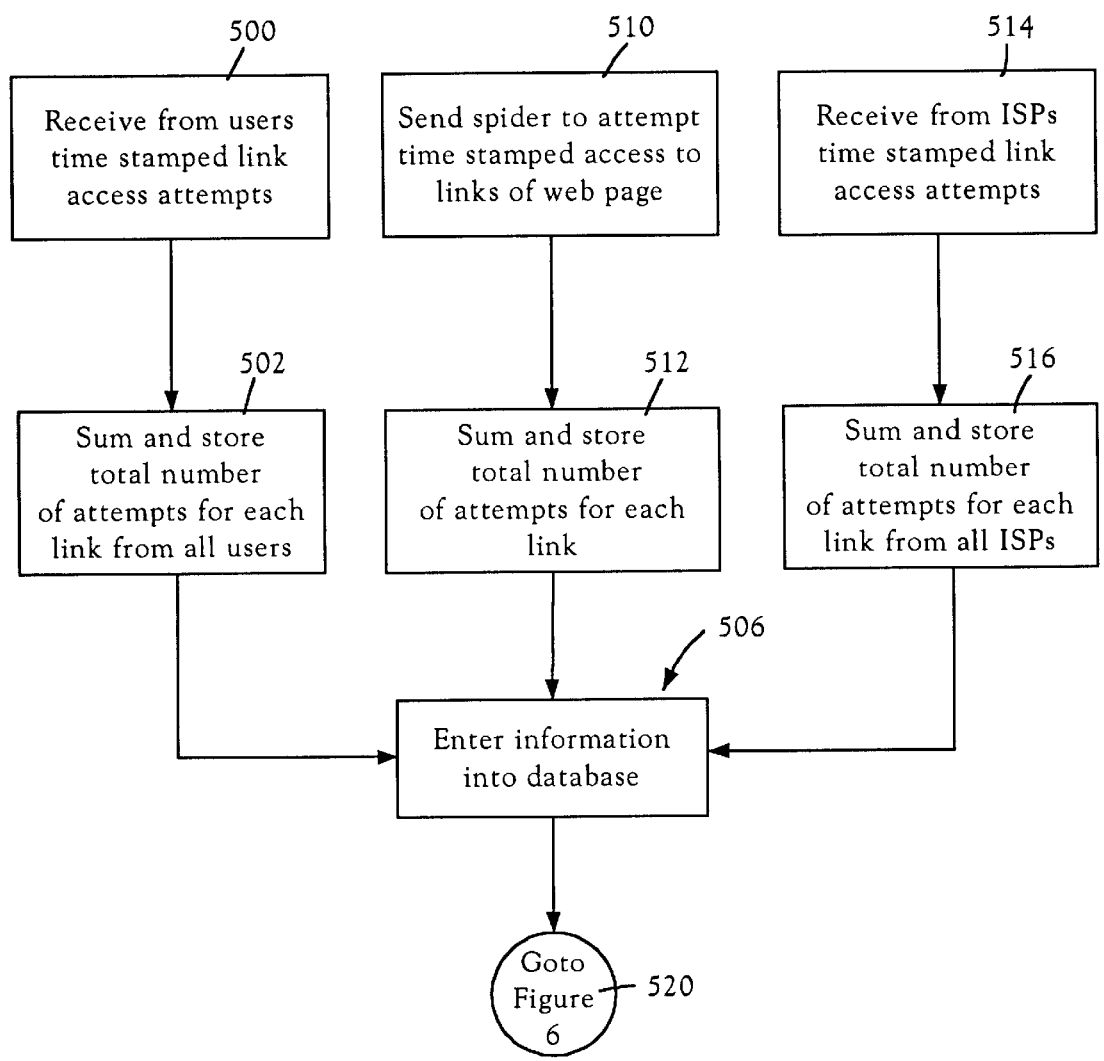
FIG. 5 is a flow chart of an exemplary process used to gather information used in calculating link viability in accordance with one embodiment of the invention.

FIG. 5 is a flowchart of an exemplary process used by a client to gather information used in calculating link viability. Although the process of FIG. 5 can be implemented by any client, third party service 188 is a prime candidate for utilizing the process of FIG. 5 since service 188 is created to house database 400 and provide information on link viability to subscribers requesting such information. The information is received 500 from other users indicating time stamped, link access attempts and their results. Those results are summed and stored 502 for each link from all users and entered 506 in database 400.

Additionally, an optional method for gathering information on link viability involves sending 510 a web spider to attempt access to various links across network 180 to return time stamped entries back to the client, e.g., third party server 188. The time stamped attempts are summed and stored 512 and entered 506 into database 400 along with the data stored 502 from users subscribing to the service provided by third party service 188.

By utilizing both methods of gathering data (i.e., receiving information from users and sending out a spider to continuously gather data) enormous amount of data can populate database 400 to provide very reliable results as to viability of a particular link. Relying on random attempts to access other links only might provide an inaccurate estimation of the link viability due to other coincidental random events like the server being down or a web page identified by the link being updated by the web master. However, by continuously gathering 510 data on various web links using the spiders, in conjunction with receiving 500 data from large numbers of users, very reliable data populates database 400 to provide a more accurate depiction of web link viability.

Additionally, the process of FIG. 5 optionally receives 514 large blocks of data from clients such as ISP 186 that gather all time stamped link access attempts from its users 100b. In this way, data can be efficiently transferred to third party service 188 which sums and stores 516 the total number of attempts for each link supplied from all ISPs 186. Preferably, the large blocks of data from the ISP 186 is supplemented by the other data gathering steps described in conjunction with FIG. 5. The process can continue 520 according to the flowchart of FIG. 6.

Figure 6:
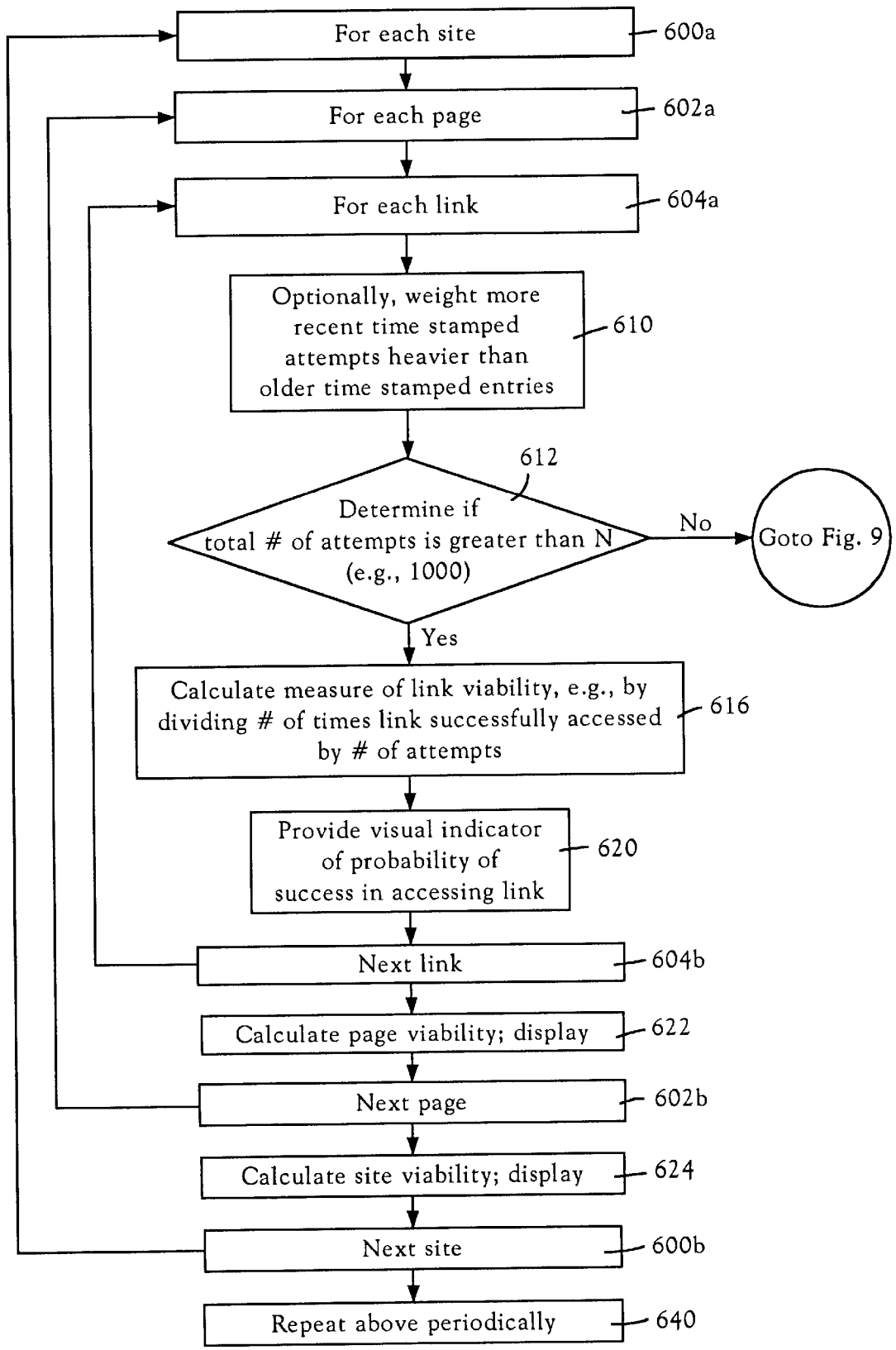
FIG. 6 is a flow chart of an exemplary process used to provide an indication of link, page and site viability in accordance with one embodiment of the invention.

FIG. 6 illustrates a flow chart of an exemplary process for utilizing data stored in database 400 which is gathered by the processes disclosed in FIGS. 2 and 5. The link viability measurement is used to provide a visual indicator to viewers prior to attempting access to a link. A site loop begins 600a for each site which concludes 600b when all sites on a server are processed. A page loop begins 602a for each page on a site and concludes 602b when each page on a site is processed. A link loop begins 604a for each link on the page where optionally, more recently time stamped link attempts are weighted 610 more heavily than older time stamped link attempt entries. Step 610 adds flexibility beyond the straight percentage approach to link viability discussed above. The flexibility to step 610 resides in the weighting of the time stamped entries.

For example, a document A stored on server 185a contains a link to a document B stored on server 185b. Assume the web master of document B updates document B from time to time, and there is no indication provided in document A during the times when document B is "down" for updating. Also assume during the week it takes the web master to update document B, the link has been successfully accessed 0 out of the 10 attempts which corresponds to a link viability of 0% during that week. However, for 52 weeks preceding the time when document B is inaccessible, the link in document A successfully accessed document B 100 out of 100 times which corresponds to a link viability rating of 100%. If a straight average were taken, link viability is calculated at 100/110 or 90.9%. However, to provide a more accurate measure of link viability, the most recent 10 failures of access occurring in the most recent week are given a weight of two times the weighting of any other attempts. In this case, this lowers the link viability rating to indicate a decreased probability that the link will be successfully accessed upon attempt. Of course, the choice in the example of weighting (two times) and the window to which the weighting is applied (one week) is entirely arbitrary, and can be adjusted according to need. For example, a window of time limited to the most recent week could easily have been replaced by the last x number of attempts regardless of time attempted. If x were chosen to be 10, the result and weighted link viability would be equivalent to doubling the weight of the number of attempts in the last week: 100/120 or 83.3%.

The process of FIG. 6 continues at decision 612 where the client determines if the total number of attempts is greater than a certain threshold number e.g., 1000. If the number of total attempts is greater than this threshold, the measure of link viability is more indicative of the likelihood of successfully accessing the link upon attempt because of statistical reliability; whereas if the number of attempts is low, below the threshold, the measure of link viability might not be accurate. For example, if only two attempts were made and one resulted in a successful access, a link viability might be rated at 50%. However, the one unsuccessful attempt might have occurred at a time when the server was uncharacteristically unavailable. Therefore, the 50% link viability measurement might not be characteristic of the probability that an attempt would result in access.

Figure 9:
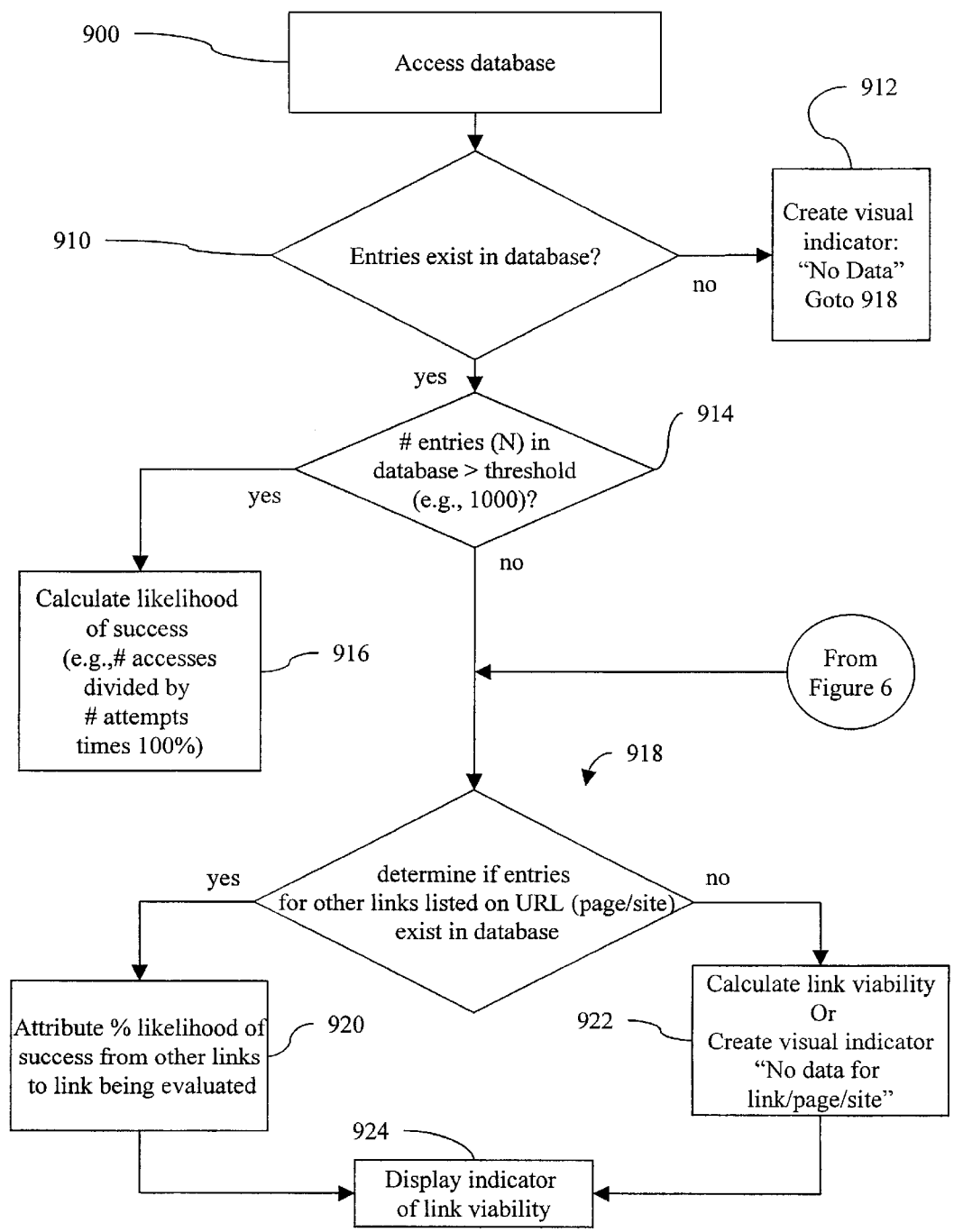
FIG. 9 is a flow chart of an exemplary process used to infer and display an indication of link viability based on viabilities of other links in accordance with one embodiment of the invention.

If the number of attempts is less than the threshold, the process proceeds to FIG. 9 (step 612-no). On the other hand, if the number of attempts was above the threshold, the process proceeds (612-yes) to calculate 616 the measure of link viability. In cases which little or no information is available for drawing a reliable inference, the document may be given a default low-reliability indication.

Next, a visual indicator is created and provided 620 to represent the link viability (i.e., the probability of successfully accessing the link). Such a visual indicator may take any number of forms. One way these indications are provided is by searching the HTML code of the page to find the "attribute: color" of the link anchor or icon, and changing this color depending on the measure of link viability. One color indicating low link viability might be blue, which could be considered analogous to "cold", and as the measure of link viability increases closer to 100% the color of the link anchor or icon changes to red indicating "hot". Other examples include adjusting the size of the link anchor or icon of an icon link, and increasing the font size of a textual link. Alternatively, the HTML code is altered to associate an icon with the link, such as a thermometer placed adjacent to the link. As link viability increases, the reading on the thermometer increases. There are many other types of indications that can display link viability.

The link loop concludes 604b and returns to calculate the link viability for the other links on the page. When there are no more link viabilities to calculate on the page, a page viability is calculated and a visual indication of the page viability is displayed 622. For example, the viabilities of all links on the page are averaged, and the original HTML code is altered to insert text, or an icon such as a thermometer, depicting an average percentage viability for all links. The page viability indicator is placed at the top of the first screen displayed to a client, such as by overlaying a text box, labeled page viability, on top of the original document.

Next, the page loop concludes 602b and returns to 602b to calculate the link viability for the links on the next page, as described above. Upon return to 602b, if there are no more pages on the site, a site viability is calculated and a visual indication of site viability is displayed 624. Then the process returns 600b to consider additional sites. The site viability indication is also provided by text or icon and is located at the top of the screen of the first page of the site. (It should be noted that the types of displays and location of link, page and site viability and location mentioned herein are non-limiting examples used to illustrate display of calculated viability.) The process is repeated periodically 640 in order to maintain updated measures of link viability, page viability and site viability and to provided corresponding indicators of each.

FIG. 7 discloses a database 700 used in determining page viability by storing data on the link viabilities calculated for all links on a particular page in accordance with page loop 602a/b of FIG. 6. Each page is associated with a unique page identifier 710, such as the URL of the page. The total number of links on the page is stored in a link number field 712. Using database 700 allows a page viability to be calculated (for example by averaging the link viabilities for all links on the page) and stored in field 714.

FIG. 8 discloses a database 800 used in determining site viability by storing data on the link viabilities calculated for all links on a particular site in accordance with site loop 600a/b of FIG. 6. Each site is associated with a unique site identifier 810, such as the URL of the site. The site viability is calculated in at least two ways; weighted and unweighted averages of the individual link viabilities on the entire site. The weighted average is stored in a field 812; the weighting for a link being inversely proportional to the number of links on that page, for example. Thus, if the number of links on a page is 10, the viability of each link on that page is multiplied by $\frac{1}{10}$, and the individual weighted link viabilities are summed to arrive at a page viability. The individual page viabilities are then averaged to arrive at the weighted average of documents on the site 812. The average viability (unweighted) for the total number of links on the site is stored in a field 814. The unweighted average takes the straight average up all links on all pages of the site, and averages the link viabilities to arrive at unweighted average of documents on the site 814.

FIG. 9 discloses a flow chart of a process of the present invention for calculating link viability differently according to varying numbers of attempts to access a link. A database, such as database 400, is accessed 900 and it is determined 910 whether a particular link has entries existing in the database. If no link entries exist (910-no), a visual indicator is created 912 identifying that there is no data in the database, and the process optionally proceeds to step 918 discussed below. If entries do exist (910-yes), the number of entries are compared 914 to a threshold, e.g., 1000. If the number of entries for a particular link are greater than the threshold, then link viability is calculated 916, for example, by calculating the straight percentage of successful attempts over the total number of attempts. If the number of entries for a particular link is not greater than the particular threshold, a determination is made 918 as to whether there are entries existing in the database for other links listed on a page or site where the link of interest resides.

Optionally, the process depicted by FIG. 9 proceeds from step 912 to step 918, or alternatively, the process from FIG. 6 proceeds to step 918 where the viability of a particular link of interest are inferred from other links on the page and site on which the link of interest resides.

If other links exist on the page, the link viability of the other links are attributed 920 (to varying degrees) to the link of interest for which there is no data or too little data. For example, if there are no entries in the database for the link of interest, the viability of the other links on a page can be averaged, and that average can be associated with the link of interest as a way to infer the link viability of the link of interest. Thus, the viability of other links on the same page or site can raise or lower the link viability of the link of interest. For example, if the number of entries for the link of interest is very close to the threshold, a large weight will be associated with the link viability calculated for the link of interest; and the weight attributed to the other links on the page will be very small because the gathered data is more likely to be statistically reliable as the entries approach the threshold. Any method can be used for inferring link viability and attributing the link viability of other links to a particular link of interest.

Alternatively, it is determined 922 that no entries exist for any other links on the page or site. In this case, the link viability is calculated based on the data existing, even though the number of entries is less than the threshold. Alternatively, if no data exists for the link of interest, a visual indicator is created 922 to inform users of the lack of data for the link, page site. Then, a visual indicator is displayed 924 identifying link viability. Alternatively, a link could be given a default low-reliability indication.

Figure 10:
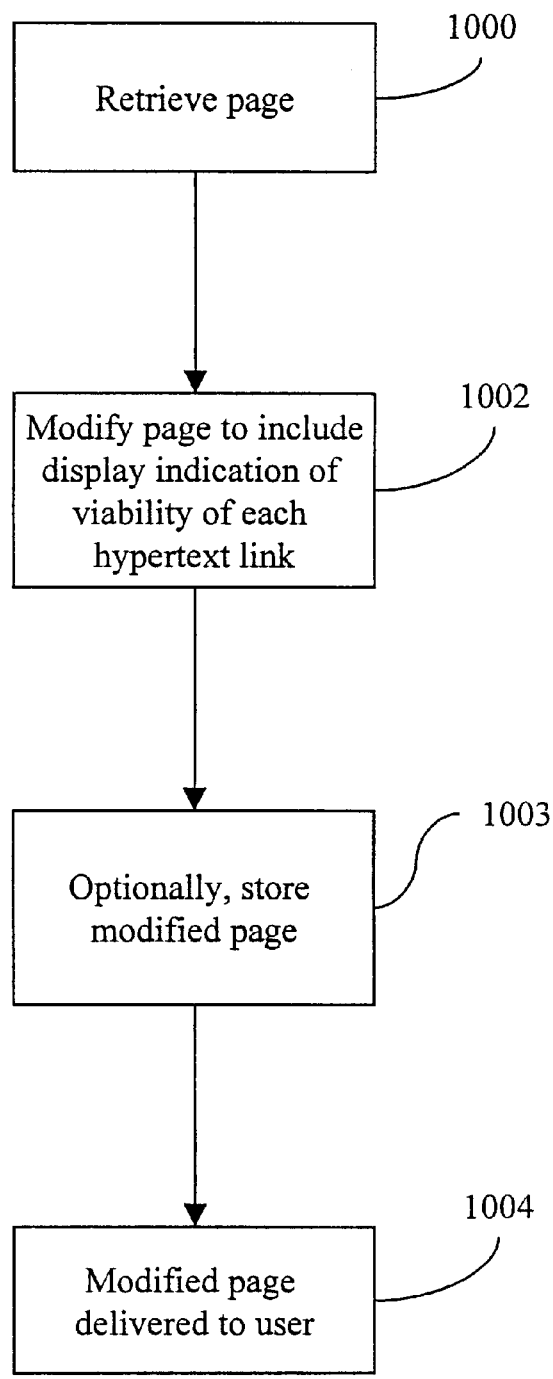
FIG. 10 is a flow chart of an exemplary process used to display an indication of link viability by modifying a document for which link viability is calculated.

FIG. 10 illustrates a flowchart for performing a process similar to that described in conjunction with FIG. 6. However, FIG. 10 describes a process performed by third party service 188 which is called upon in between the client requesting the document and the server providing the web page document. Alternatively, a server-side software ISP 186, or a browser developer could implement this process.

Initially, the page is retrieved 1000 from server 185a. Before being sent to the requesting client, the page is modified 1002 to included display of an indication of link viability for each hypertexted link on the page requested. The page is modified 1002 in a manner similar to that described in conjunction with FIG. 6 such as to provide page site link ratings of viability. Optionally, the modified page is stored 1003. Next, the modified page is delivered 1004 to the client for display, optionally in real time. Thus, the visual indication of link viability is performed on the fly without any noticeable delay caused by third party server 188 intervening in the request of the document in order to provide the visual indicator of link viability. Of course, the indications of page viability and/or site viability can be supplied during steps 1002 and 1004 as a way to provide a page rating or site rating to the requester.

Figure 11:
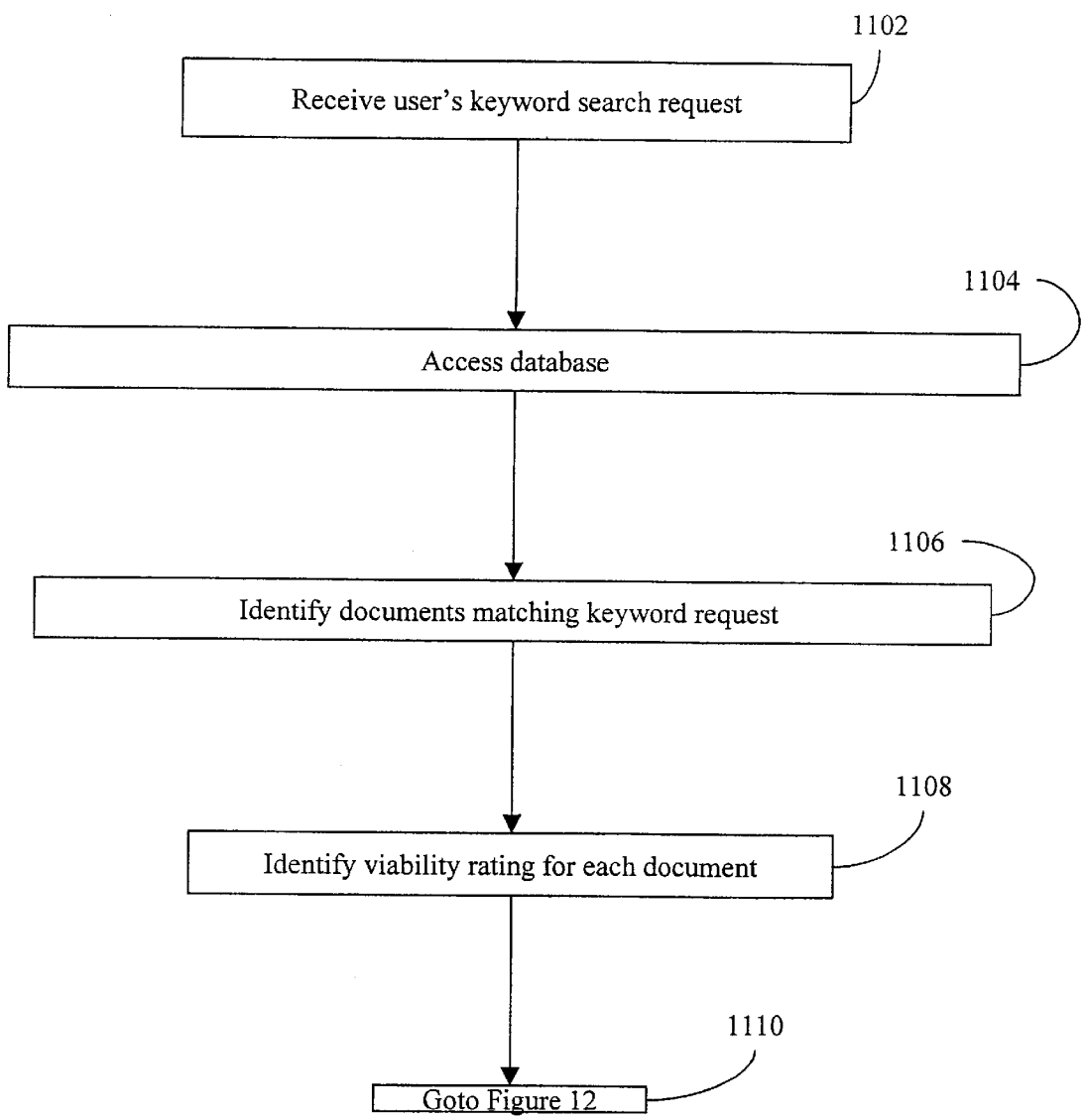
FIGS. 11 and 12 are flow charts of an exemplary process used to combine link viability calculations with key word search results.

FIG. 11 depicts a flowchart for an exemplary process for utilizing link viability in conjunction a key word or other page element search request. In this way, users profit from document rating during web searches. A search engine receives 1102 a user's key word search request, and then accesses 1104 a database containing conventional search indices, and data such as that stored in database 700, to identify 1106 documents matching the key word request. Next, the viability rating for each document is identified 1108 by accessing the portion of the database corresponding to database 700. The documents identified at step 1106 can optionally be displayed at this point, but is preferable to continue 1110 to FIG. 12.

Figure 12:
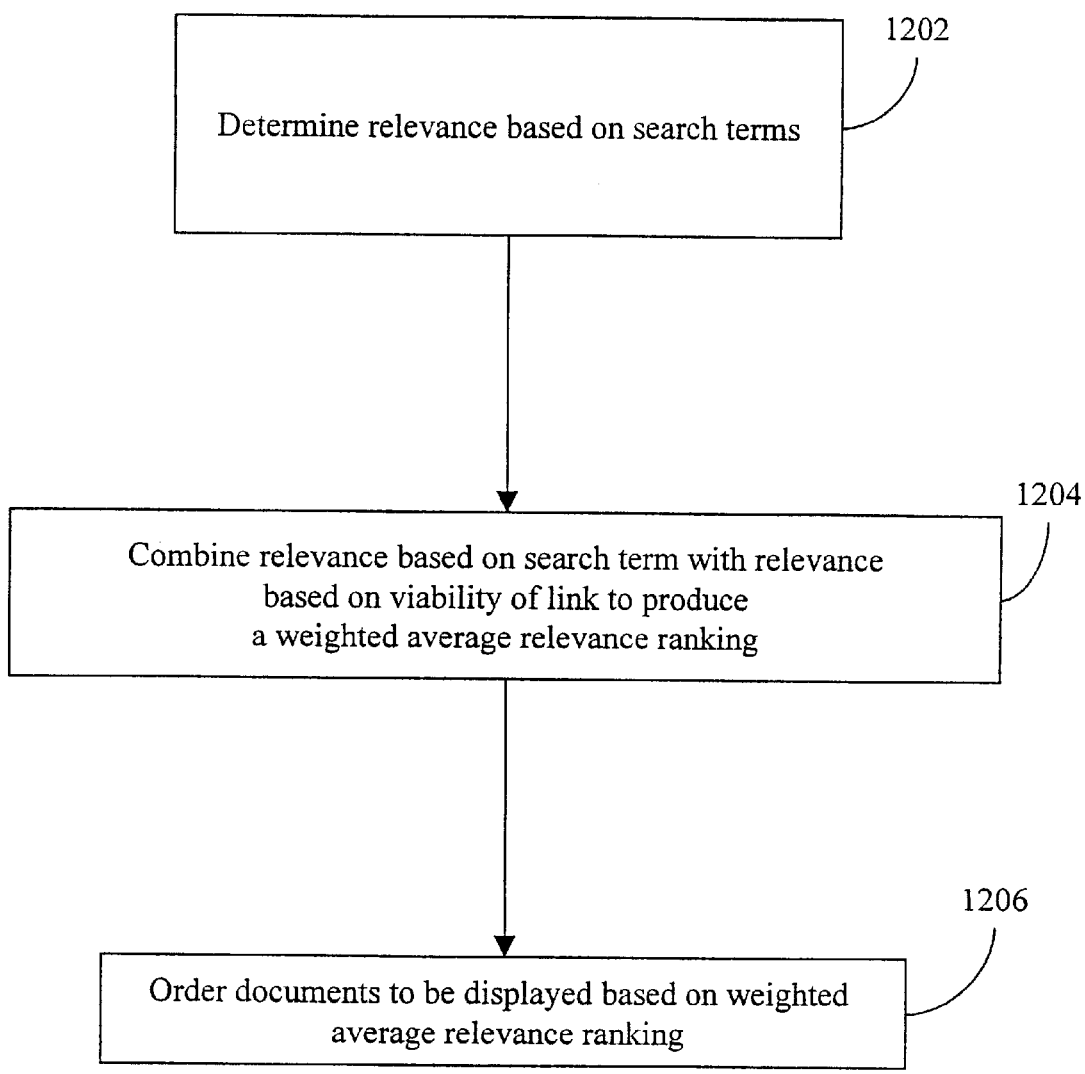

FIG. 12 is a flowchart of an exemplary process for ordering or sorting documents based on relevance ranking and link viability. Generally, when a user submits a query, the search engine looks for the key words or other page elements in the index of the database the search engine has already constructed. The search engine then creates a new HTML page on the fly, listing the results of the user's search. Most search engines display the URLs and titles of the documents. Some also list the first few sentences of the documents as well, and some rank the sites for relevancy according to how closely they match the request. The results page comes complete with hypertexted links for the web pages contained in the database. To go to the actual page, the user merely has to activate the link, such as by "clicking" with a mouse pointer.

In FIG. 12, a search engine determines 1202 the relevance of a document based on the search terms input by a user. The search term relevance and document rating as stored in database portion 700 is combined 1204 to produce a weighted-average relevance ranking for a document. The documents are ordered or sorted 1206 for display based on weighted-average relevance ranking. Conventional systems display a "relevance ranking" based on the number of key words contained in a document. This display is altered to reflect the weighted-average relevance ranking and/or the document rating.

Figure 13:
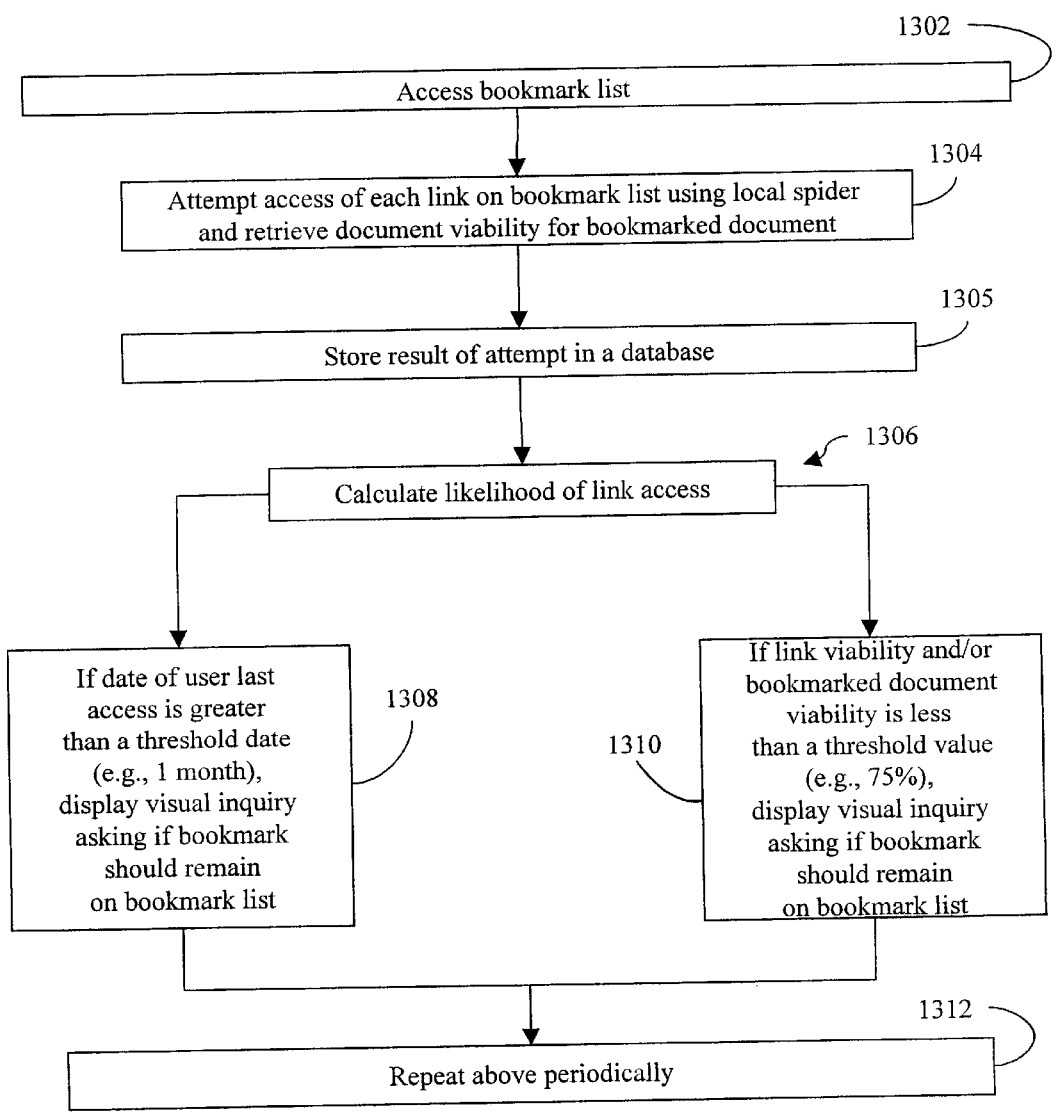
FIG. 13 is a flow chart of an exemplary process used to identify links to be culled from a bookmark list using link viability using viability calculations in accordance with one embodiment of the invention.

FIG. 13 is a flowchart of an exemplary process for culling bookmarks off of a user's bookmark link list. The process begins when a bookmark list is accessed 1302. An attempt is made 1304 to access each link on the bookmark list using a local spider. Optionally, the process also retrieves the document viability of the document bookmarked from a database residing, for example on the user's computing device or on third party service 188. The result of the attempt is stored 1305 in a database, and link viability (i.e., the likelihood of link access) is calculated 1306. If the date of user's last access is determined 1308 to be greater than a threshold date, a prompt such as a visual inquiry is initiated, asking if the bookmark should remain on the list. This assists the user in evaluating whether or not to maintain a bookmark on the list depending on how often the bookmark is accessed. Alternatively, if link viability is determined to be 1310 less than a threshold value, 75% for example, or if the document viability of the document to which the bookmark points is less than a threshold, a prompt such as a visual inquiry is displayed asking if the bookmark should remain on the list. This helps to remove bookmarks from the list which have a low link viability rating or which access documents with low document viability rating. A user adjusts the threshold by typing in the amount of the desired threshold value or moving an adjustable slider graphic or other user interface mechanism. The procedure is repeated periodically 1312 in order to keep a user's bookmark list current. Any time a bookmark is accessed from a bookmark list, a message having a format similar to that depicted in FIG. 3 is forwarded to a database 1400.

FIG. 14 illustrates a typical format of a database 1400 in which a plurality of messages 300 indicating information about a link attempt are stored. For example, each bookmark is associated with a unique identifier 1402, such as its URL, and also a bookmark descriptor 1404 which is a user designated name for the bookmark which is typically more comprehensible than the URL. The date of last access to the bookmark is place in access field 1406 in order to be able to determine how long it has been since the bookmark has been used.

Figure 15:
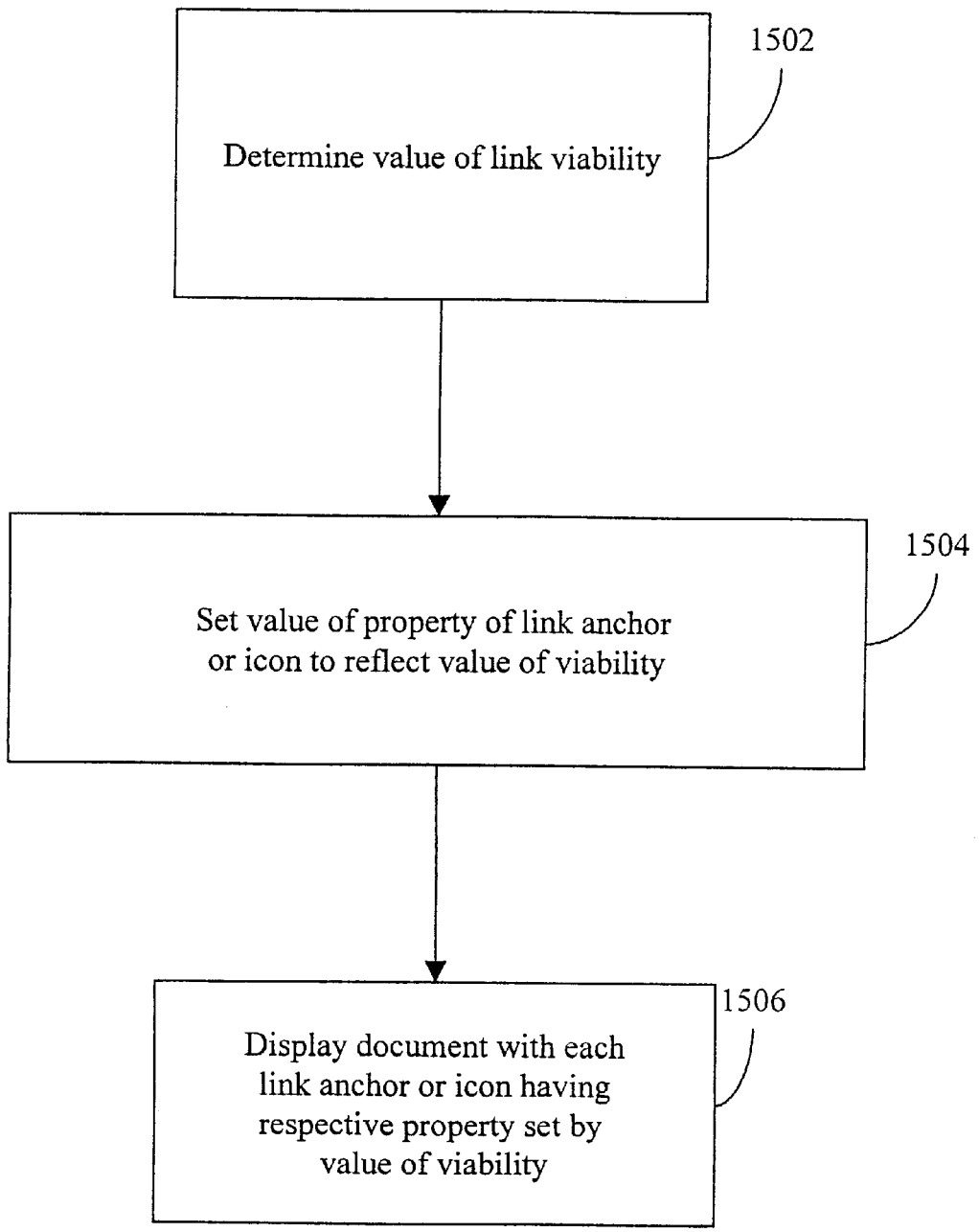
FIG. 15 is a flow chart of an exemplary process used to adjust properties of displays having links, based on link viability.

FIG. 15 is a flowchart of an exemplary process for displaying an indication of link viability alone with the link. The process begins by determining link viability 1502 according to any suitable method utilizing previous results of attempts to access the link. Next, a value of a property of a link anchor or icon is set 1504 to reflect the viability of the link. As mentioned above, the mark-up language (e.g., HTML) dictating the display of the document containing the link, is searched and altered to reflect the viability. The document containing the link is then displayed 1506 with each link anchor or icon having the respective property value set utilizing the link viability as determined 1502.

In the manner indicated, the problems as found in the prior art with the respect to indicating link viability are significantly alleviated and user experience in navigating an information space is greatly enhanced.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. Computer apparatus, comprising:
   a communications interface;
   a storage medium, connected to said communications interface, configured to store link identification data identifying information links to resources on a network and data generated from results of previous attempts at accessing documents identified by information links; and
   a computer, connected to said communications interface and said storage medium, configured to calculate link viability based on said results of previous attempts.

2. The computer apparatus of claim 1 in which said computer is further configured to send and receive over said communication interface and store information about information links in a message passed over said communications interface.

3. The computer apparatus of claim 2 in which said message comprises data reporting the result of attempts to access information links and a time stamp indicating a time of the attempt.

4. The computer apparatus of claim 1 in which the computer is further configured to run a spider process to attempt access to documents stored on the network pointed to by information links.

5. The computer apparatus of claim 1 in which the computer is further configured to modify a presentation attribute of a document stored on said computer based on said calculated link viability.

6. The computer apparatus of claim 1 in which said information link is located on a bookmark list, and said computer is further configured for identifying at least bookmarked document, and said computer is further configured to calculate a document viability of each bookmarked document, and if at least one of said link viability and said document viability are less than a threshold value, then create an inquiry to a user as to whether the bookmarked document should remain on the bookmark list.

7. The computer apparatus of claim 6 further comprising means for displaying at least one of said link viability of said information link to said bookmarked document and the document viability of said bookmarked document, so that the at least one of said link viability and said document viability is associated with said bookmark list.

8. A method of determining viability of an information link located on a document accessible via a network, comprising the steps of:
   attempting to access said information link; and
   storing results of each attempted access and calculating a measure of link viability from said results.

9. The method of claim 8, further comprising accessing said document containing said information link before attempting to access said information link.

10. The method of claim 7, further comprising repeating said accessing and said attempting steps, and storing said results of each attempt in a database.

11. The method of claim 8, in which said attempting is achieved by using a spider.

12. The method of claim 8, in which said attempting done by at least one of a user computing device, and Internet Service Provider, a proxy server and a server.

13. The method of claim 8, further comprising comparing a threshold value with said link viability to determine if said link viability exceeds said threshold.

14. The method of claim 8, in which said storing comprises sending said result via a network to a third party service.

15. The method of claim 8, further comprising determining the date and time at which said attempts were stored, and weighting said stored results based on said date and time to calculate link viability.

16. A method of determining viability of at least one information link located on a network device, where said at least one information link is located on a bookmark list identifying at least one bookmarked document, comprising the steps of: attempting to access each said information link, calculating at least one of a document viability of each bookmarked document and a link viability, and if at least one of said link viability and said document viability are less than a respective threshold value, then creating an inquiry to a user as to whether the bookmarked document should remain on the bookmark list.

17. The method of claim 16, further comprising displaying at least one of said link viability of said information link to said bookmarked document and the document viability of said bookmarked document, so that the at least one of said link viability and said document viability is associated with said bookmark list.

18. The method of claim 16, further comprising determining if the number of stored results of said attempts to access said information link exceed a threshold value, and if not, inferring link viability from a second calculation of link viability for at least one other information link in said document.

19. A method of determining viability of an information link located on a document accessible by a network, comprising the steps of:
   receiving data indicating results of information link access attempts; and
   calculating link viability based on said data.

20. The method of claim 19, further comprising storing said data in a database.

21. The method of claim 20, further comprising setting a property of a link anchor or icon associated with said information link based on said calculation of link viability.

22. A method of retrieving a document, comprising:
   searching information retrieval system for documents containing one or more page elements; and
   ordering search results based on the number of page elements and the viability of a link to a document.

23. The method of claim 22, further comprising displaying said search results with an indication of the number of page elements and the viability, along with a link to each document corresponding to the ordered search results.

24. The method of claim 23, further comprising displaying said document with said link anchor or icon set based on said link viability.

25. The method of claim 22, further comprising displaying a visual indication of said link viability along with displaying said document.

26. A method of rating a web document, comprising the steps of:
   retrieving link access attempt data from a database for each information link contained in said web document;
   calculating link viability for all links on said web document based on said link access attempt data; and
   rating of said web document for which link viability is calculated based on said link viability for all links on said web document.

27. A method of rating a web site, comprising the steps of:
   retrieving link access attempt data from a database for each information link contained in said web site;
   calculating link viability for all links on said web site based on said link access attempt data; and
   rating of said web site for which link viability is calculated based on said link viability for all links on said web site.

28. A computer program product comprising:
   a memory medium; and
   a computer program stored on said memory medium, said computer program comprising instructions for attempting access of an information link located on a document accessible via a network, and storing results of each attempted access and calculating a measure of link viability from said results.

29. The computer program product of claim 27, in which the instructions further comprise accessing said document containing at least one information link before attempting to access said information link.

30. The computer program product of claim 28, in which the instruction further comprise repeating said accessing and said attempting steps, and storing said result of said attempt in a database.

31. The computer program product of claim 28 in which said information link is located on a bookmark list, and said computer program product further comprises instructions for identifying at least one bookmarked document, and said computer is further configured to calculate a document viability of each bookmarked document, and if at least one of said link viability and said document viability are less than a threshold value, then create an inquiry to a user as to whether the bookmarked document should remain on the bookmark list.

32. The computer program product of claim 31 in which the computer program product further comprises instructions for displaying at least one of said link viability of said information link to said bookmarked document and the document viability of said bookmarked document, so that the at least one of said link viability and said document viability is associated with said bookmark list.

33. A system for information retrieval comprising:
a network;
at least one server computer apparatus, storing a first document having an information link pointing to a second document, and configured to deliver said first document across the network in response to a document request;
at least one client computer apparatus, connected to said network, configured to request access to said first document; and
a database, accessible by said client computer apparatus, that stores results of previous attempts at accessing said second document and provides an indication of link viability of said information link based on said stored results.

34. A method of providing an indication of link rating based on link viability, comprising:
determining link viability based on previous successful attempts at accessing an information link; and
altering a display of a document containing said information link based on said determination of link viability.

35. The method of claim 34, in which the step of altering comprises the step of searching a document code for said information link and changing an attribute of said information link based on said link viability determination.

36. A computer program product comprising:
a memory medium; and
a computer program stored on said memory medium, said computer program comprising instructions for
retrieving link access attempt data from a database for each information link contained in said web document;
calculating link viability for all links on said web document based on said link access attempt data; and
rating of said web document for which link viability is calculated based on said link viability for all links on said web document.

37. A computer program product comprising:
a memory medium; and
a computer program stored on said memory medium, said computer program comprising instructions for
retrieving link access attempt data from a database for each information link contained in a web site;
calculating link viability for all links on said web site based on said link access attempt data; and
rating of said web site for which link viability is calculated based on said link viability for all links on said web site.

38. A computer program product comprising:
a memory medium; and
a computer program stored on said memory medium, said computer program comprising instructions for attempting access of a document pointed to by said information link, and storing a result of said attempted access,
wherein said information link is located on a bookmark list, and said computer program product further comprises instructions for identifying at least one bookmarked document, and calculating a document viability of each bookmarked document, and if at least one of said link viability and said document viability are less than a threshold value, then creating an inquiry to a user as to whether the bookmarked document should remain on the bookmark list.

39. The computer program product of claim 8 in which the computer program product further comprises instructions for displaying at least one of said link viability of said information link to said bookmarked document and the document viability of said bookmarked document, so that the at least one of said link viability and said document viability is associated with said bookmark list.

* * * * *